United States Patent

Onagi et al.

Patent Number: 5,681,633
Date of Patent: Oct. 28, 1997

[54] MAGNETO OPTICAL DISC, APPARATUS FOR REPRODUCING THE SAME AND METHOD OF REPRODUCING THE SAME

[75] Inventors: Nobuaki Onagi; Nobuyasu Negishi; Takamasa Yoshikawa, all of Tsurugashima, Japan

[73] Assignee: Pioneer Electronic Corporation, Tokyo-to, Japan

[21] Appl. No.: 643,410

[22] Filed: May 6, 1996

Related U.S. Application Data

[63] Continuation of Ser. No. 273,911, Jul. 12, 1994, abandoned.

[30] Foreign Application Priority Data

Jul. 19, 1993 [JP] Japan ................ 5-177728
Nov. 2, 1993 [JP] Japan ................ 5-274008

[51] Int. Cl.$^6$ ................ G11B 5/66
[52] U.S. Cl. ................ 428/64.3; 428/694 ML; 428/694 MM; 428/694 EC; 428/694 SC; 428/694 LE; 428/694 IS; 428/611; 428/615; 428/621; 428/635; 428/668; 428/670; 428/900; 369/275.2; 369/275.3; 365/122; 360/59; 360/114
[58] Field of Search ................ 428/694 ML, 694 MM, 428/694 EC, 694 SC, 694 LE, 694 IS, 900, 611, 615, 621, 635, 668, 670, 64.3; 369/275.2, 275.3; 365/122; 360/59, 116

[56] References Cited

U.S. PATENT DOCUMENTS 5,428,586  6/1995  Kobayashi et al. ............ 369/13

FOREIGN PATENT DOCUMENTS 229292  7/1987  European Pat. Off. .
258978  3/1988  European Pat. Off. .
304873  3/1989  European Pat. Off. .

OTHER PUBLICATIONS

Aratani et al "Magnetic and Magneto-optic Properties of TbFeCoAl Films"; J. Appl. Phys. (57)(1); Apr. 15, 1985 pp. 3903–3905.

Gambino et al "Exchange Coupled CoPd/TbCo Magneto-optic Storage Films"; IEEE Trans. Magn. (75)(5); Sep. 1989; pp. 3749–3751.

Primary Examiner—Leszek Kiliman
Attorney, Agent, or Firm—Kane, Dalsimer, Sullivan, Kurucz, Levy, Eisele and Richard, LLP

[57] ABSTRACT

A magneto optical disc, is provided with: a record layer to which information is recorded in a perpendicular magnetization condition; a switch layer, which perpendicular magnetic anisotropy is reduced at a room temperature and is increased at a temperature close to a predetermined reproduction temperature; and a reproduction layer opposed to the record layer through the switch layer to have a switched connection with the record layer by the switch layer.

9 Claims, 9 Drawing Sheets

$Gd_{28}(Fe_{98}Co_2)_{72}$

MAGNETO OPTICAL DISC, APPARATUS FOR REPRODUCING THE SAME AND METHOD OF REPRODUCING THE SAME

This application is a continuation, of application Ser. No. 08/273,911 filed Jul. 12, 1994, now abandoned.

BACKGROUND OF THE INVENTION

1. Field of the Invention

The present invention generally relates to a magneto optical disc, to which information is recorded by magneto optical recording, and an apparatus for and a method of reproducing the same. More particularly, it relates to a magneto optical disc of a high information recording density type, to which information is recorded with a spatial frequency higher than the spatial frequency prescribed by the wavelength of the reproducing light and the numerical aperture of the objective lens at the time of reproduction, and the apparatus for and the method of reproducing the same.

2. Description of the Related Art

A magneto optical disc has an information recording surface, to which audio and video information etc., is recorded by means of magneto optical recording technique.

FIG. 11 shows a construction of such an information recording surface of the magneto optical disc.

In FIG. 11, there are formed grooves G, which are guiding grooves having approximately coaxial shape, on the magneto optical disc. Lands L are formed along the grooves G. Information pits (i.e. recording marks) are formed on the lands L, while the grooves G are remained free in order to read the information pits without error.

If information pits i.e. address pits and information pits were formed on both of the grooves G and the lands L of such a magneto optical disc, cross talk would occur to cause a problem that the information pits cannot be correctly read by a light spot LS.

In order to prevent the above mentioned problem, there is a super resolution reproduction technique such as a MSR (Magnetically induced Super Resolution).

Here, the MSR is explained.

In the field of microscope, there is a technique to increase the resolution by disposing an optical mask such as a pin hole at the position of an object. The MSR is such a technique that, instead of disposing a physical mask at the surface of the medium of the magneto optical disc, an effective mask is formed within the medium by use of the temperature distribution of the medium, so as to effectively increase the spatial frequency at the limit of reproduction. By the MSR, the recording density can be improved as high as about 1.5 to 3 times of the conventional magneto optical disc (it is explained in more detail in Japanese Applied Magnetic Academy Paper: Super Resolution Magneto Optical Disc, Vol. 15, No. 5. 1991 etc.).

A construction of one example of the magneto optical disc using the MSR, is shown in FIG. 12.

In FIG. 12, a magneto optical disc 1P is provided with: a reproduction layer P', which coercive force is relatively small; a record layer R', which coercive force is relatively large and to which information is recorded in the condition of perpendicular magnetization; and a switch layer S' for controlling the switched connection force between the reproduction layer P' and the record layer R'.

Here, the reproducing operation of the above mentioned magneto optical disc, is explained.

If the output power of the laser beam, which is the reproducing light, is set to an appropriate value, a high temperature domain $D_H$, which temperature is high, is formed at the back portion of the light spot LS with respect to the light spot moving direction, as shown in FIG. 12.

When the temperature of the switch layer S' in the high temperature domain $D_H$, increases to be not less than its curie point, the magnetic domain of the switch layer S', disappears. Namely, the coercive force becomes zero, so that the switched connection force between the reproduction layer P' and the record layer R', becomes small. At the same time, if the reproduction magnetic field Hr is applied from the external, the magnetization direction of the reproduction layer P' which coercive force is small, is aligned in the magnetization direction of the reproduction magnetic field Hr.

Therefore, the high temperature domain $D_H$ becomes a mask domain, where the record information of the record layer R' cannot be read out. The record information of the record layer R' is only from the low temperature domain $D_L$, which has a crescent shape in the light spot LS, so that the size of the spot can be made substantially small. Accordingly, information which has a spatial frequency higher than the physical spatial frequency of the light spot, can be reproduced. Namely, the super resolution reproduction can be performed.

In the reproducing operation of the above mentioned magneto optical disc, the high temperature domain becomes the mask domain, while the reproduction is performed by use of the information from the low temperature domain having the crescent domain. Thus, although it is possible to increase the recording density in the time axis direction i.e. the circumferential direction of the disc or the light spot moving direction, it is not possible to increase the recording density in the radial direction of the disc, which is perpendicular to the time axis direction.

Therefore, if the track pitch were narrowed while the above mentioned reproduction method were used, the cross talk would occur so that a correct information reproduction cannot be performed, which is a problem.

SUMMARY OF THE INVENTION

It is therefore an object of the present invention to provide a magneto optical disc, an apparatus for reproducing the magneto optical disc and a method of reproducing the magneto optical disc, which can increase the recording density in the radial direction of the disc as well as the time axis direction.

The above object of the present invention can be achieved by a magneto optical disc, which is provided with: a record layer to which information is recorded in a perpendicular magnetization condition; a switch layer, which perpendicular magnetic anisotropy is reduced at a room temperature and is increased at a temperature close to a predetermined reproduction temperature; and a reproduction layer opposed to the record layer through the switch layer to have a switched connection with the record layer by the switch layer.

According to the magneto optical disc of the present invention, after initializing the reproduction layer by use of the initializing magnetic field from the external, the reproducing light is irradiated such that the temperature of the switch layer is increased to be close to the reproduction temperature.

Here, if the anisotropic constant Ku and the magnetization Ms of the medium, fulfills a following expression, it becomes a perpendicular magnetization.

$$Ku > 2\pi Ms^2$$

Since a temperature close to the reproduction temperature is the compensation temperature in the switch layer, the magnetization Ms is small in the vicinity of this temperature.

Therefore, the switch layer is increased in its perpendicular magnetic anisotropy. And, the switched connection force is strongly generated and applied between the perpendicular magnetization films. Thus, the switch layer applies the switched connection force between the reproduction layer and the record layer at the temperature close to the reproduction temperature, so that the perpendicular magnetization condition of the record layer is transferred to the reproduction layer.

In this manner, the perpendicular magnetic anisotropy is increased in the switch layer, and the perpendicular magnetization condition of the record layer is transferred to the reproduction layer by the action of the switched connection force between the reproduction layer and the record layer via the switch layer.

Therefore, the record information of the record layer only at the reproduction position corresponding to the position where the perpendicular magnetic anisotropy of the switch layer becomes large, is transferred. Thus, by constructing the optical system such that the information from the reproduction layer in the initialized condition is not detected, and that the information from the reproduction position is detected, the information from the area which is smaller than the spot diameter of the reproduction light spot, can be reproduced, so that the super resolution reproduction can be performed.

The above mentioned object of the present invention can be also achieved by an apparatus for reproducing information of the above described magneto optical disc of the present invention. The reproducing apparatus is provided with: a magnetization direction initializing device for applying an initializing magnetic field to the magneto optical disc to align the perpendicular magnetization direction of the reproduction layer into a predetermined direction; a light irradiation device for irradiating a reproducing light to form a light spot at a reproduction position of the magneto optical disc; a reproduction output controlling device for controlling an output power of the reproducing light such that a temperature of the switch layer corresponding to the reproduction position becomes not less than the predetermined reproduction temperature, to transfer the perpendicular magnetization condition of the record layer to the reproduction layer at the reproduction position; a light detection device for detecting the reproducing light from the reproduction position; and a reproduction device for reproducing the information on the basis of the detected light.

According to the apparatus for reproducing the magneto optical disc of the present invention, the magnetization direction initializing device aligns the perpendicular magnetization direction of the reproduction layer in a predetermined direction prior to the reproduction of the magneto optical disc.

On the other hand, the reproduction output controlling device controls the light irradiation device to set the output power of the reproducing light so that the temperature of the switch layer corresponding to the reproduction position be not less than the reproduction temperature.

As a result, the switch layer becomes in the perpendicular magnetization condition at the reproduction position. Thus, the perpendicular magnetization condition of the record layer is transferred to the reproduction layer by the action of the switched connection force between the reproduction layer and the record layer via the switch layer.

Therefore, the record information of the record layer is transferred only at the position where the perpendicular magnetic anisotropy of the switch layer is made large, i.e. only at the reproduction position. Thus, by receiving the reproduction light from the reproduction position by use of the reproduction device and performing the reproduction of the record information, the information from the domain smaller than the spot diameter of the reproducing light, can be reproduced. In this manner, the super resolution reproduction can be performed.

In one aspect of the present invention, the magnetization direction initializing device is replace by a magnetic field applying device for applying a reproduction magnetic field to the magneto optical disc at the reproduction position. In this case, the same advantageous effect mentioned above, can be achieved by applying the magnetic field at the time of reproduction to read the information only at the reproduction position of the reproduction layer.

The above mentioned object of the present invention can be also achieved by a method of reproducing information from the magneto optical disc of the present invention. The reproducing method is provided with the steps of: preparing the magneto optical disc; applying an initializing magnetic field to said magneto optical disc to align the perpendicular magnetization direction of said reproduction layer into a predetermined direction; irradiating a reproducing light to form a light spot at a reproduction position of said magneto optical disc; controlling an output power of said reproducing light such that a temperature of said switch layer corresponding to the reproduction position becomes not less than the predetermined reproduction temperature, to transfer the perpendicular magnetization condition of said record layer to said reproduction layer at the reproduction position; detecting the reproducing light from the reproduction position; and reproducing the information on the basis of the detected light.

According to the reproducing method of the present invention, the perpendicular magnetization direction of the reproduction layer is aligned in a predetermined direction prior to the reproduction of the magneto optical disc.

On the other hand, the output power of the reproducing light is controlled so that the temperature of the switch layer corresponding to the reproduction position be not less than the reproduction temperature.

As a result, the switch layer becomes in the perpendicular magnetization condition at the reproduction position. Thus, the perpendicular magnetization condition of the record layer is transferred to the reproduction layer by the action of the switched connection force between the reproduction layer and the record layer via the switch layer.

Therefore, the record information of the record layer is transferred only at the position where the perpendicular magnetic anisotropy of the switch layer is made large, i.e. only at the reproduction position. Thus, the information from the domain smaller than the spot diameter of the reproducing light, can be reproduced. In this manner, the super resolution reproduction can be performed.

In another aspect of the present invention, the step of applying an initializing magnetic field, is replace by the step of applying a reproduction magnetic field to the optical disc at the reproduction position. In this case, the same advantageous effect mentioned above, can be achieved by applying the magnetic field at the time of reproduction to read the information only at the reproduction position of the reproduction layer.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 2A is a fragmentary view similar to FIG. 2 depicting an alternative construction for the initializing magnet.

DETAILED DESCRIPTION OF THE PREFERRED EMBODIMENTS

Referring to the accompanying drawings, embodiments of the present invention will be now explained.

First Embodiment

Figure 1:
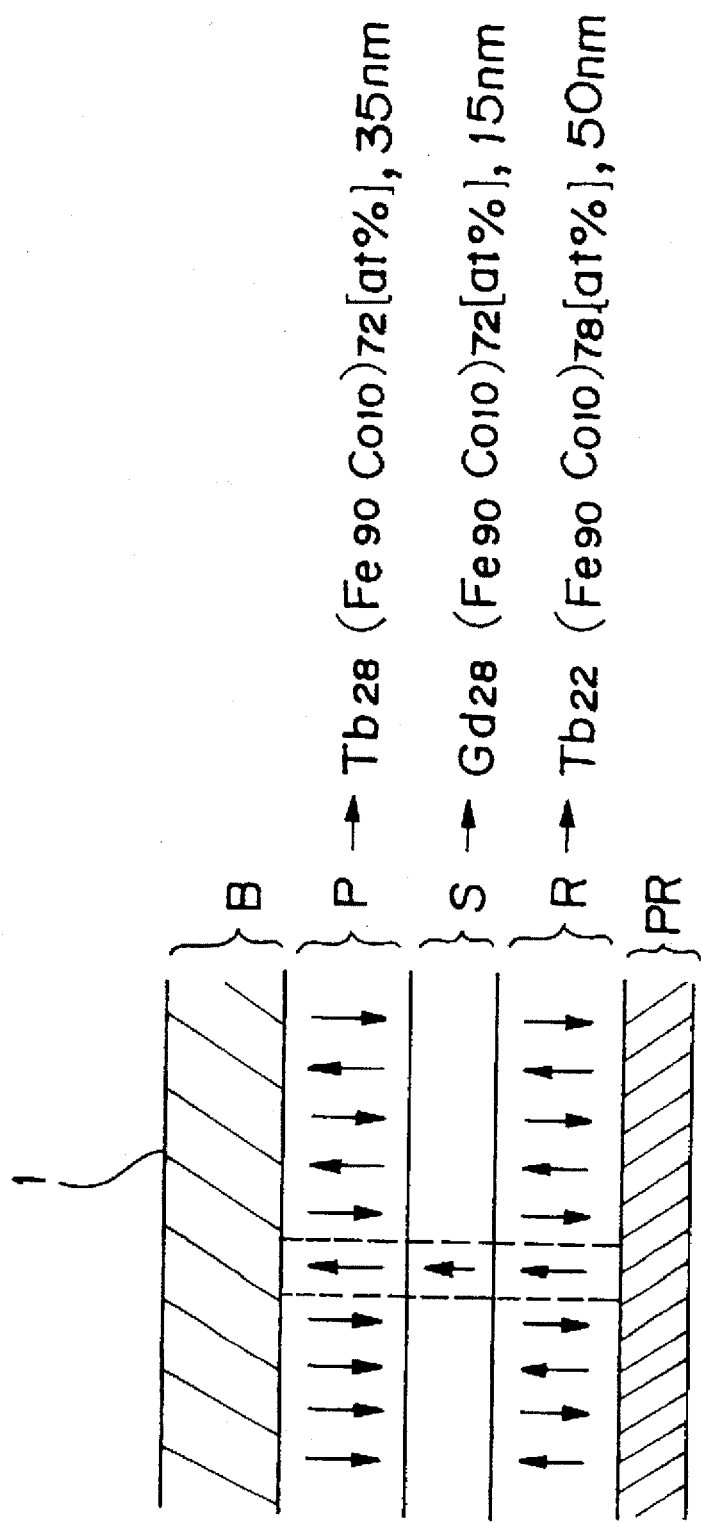
FIG. 1 is a cross sectional view showing a construction of a magneto optical disc according to a first embodiment of the present invention.

FIG. 1 shows a cross sectional view of a magneto optical disc as a first embodiment of the present invention.

In FIG. 1, a magneto optical disc 1 is provided with: a protection layer PR for protecting a magneto optical layer; a record layer R for recording information by its perpendicular magnetization condition; a switch layer S which is in an inplane magnetization condition at a room temperature, and which is in a perpendicular magnetization condition at a temperature not less than a predetermined reproduction temperature; a reproduction layer P formed to establish a switched connection with the record layer R via the switch layer S; and a substrate B having a disc shape.

Here, concrete constructions of the record layer R, the switch layer S and the reproduction layer P are explained.

In the following explanation, a reference mark Hc1 represents a coercive force in the case where the reproduction layer P is solely provided, Hc3 represents a coercive force in the case where the record layer R is solely provided. Hw1 represents a switched connection force which is applied to the reproduction layer P from the switch layer S. Hw3 represents a switched connection force which is applied to the record layer R from the switch layer S. σ1 represents the energy of a surface magnetic domain wall between the reproduction layer P and the switch layer S. σ2 represents the energy of a surface magnetic domain wall between the record layer R and the switch layer S. Ms1 represents a magnetization of the reproduction layer P. h1 represents a film thickness of the reproduction layer P. Ms3 represents a magnetization of the record layer R. h3 represents a film thickness of the record layer R. Hini represents an initializing magnetic field.

Here, in order to transfer the magnetization condition i.e. record mark from the record layer to the reproduction layer by the switch layer, the following conditions are required in the present embodiment.

Firstly, at the room temperature, following expressions (1) to (3) should be fulfilled.

$$Hini > Hc1 + Hw1 \quad (1)$$

This expression (1) gives the condition that the reproduction layer can be initialized at the room temperature.

$$Hc1 > Hw1 \quad (2)$$

This expression (2) gives the condition that the reproduction layer maintains its initialized condition at the room temperature.

$$Hc3 - Hw3 > Hini \quad (3)$$

This expression (3) gives the condition that the magnetization condition of the record layer is not erased by the initializing magnetic field.

Here, as aforementioned, the perpendicular magnetic anisotropy of the switch layer is small at the room temperature, and the switched connection forces Hw1 and Hw3 are small. Therefore, by combining the expressions (1) and (3), a following expression (4) is obtained.

$$Hc1 < Hini < Hc3 \quad (4)$$

Thus, the expression (2) can be ignored at the room temperature.

Further, since the right side of the expression (2) is small, the switched connection force Hc1 can be made small. Accordingly, from the expression (4), it can be concluded that it is possible to make the switched connection force Hini small.

Secondly, at the reproduction temperature, following expressions (5) and (6) should be fulfilled.

$$Hw1 > Hc1 \quad (5)$$

This expression (5) gives the condition that the record mark is transferred to the reproduction layer at the reproduction temperature. Here, it is to be noted that the sign of inequality in the expression (5) is reverse to that of the expression (2). However, at the temperature close to the compensation temperature (=reproduction temperature) of the switch layer, the change of the magnetization Ms is radical. Thus, the change of the switched connection force Hw1 is also large, so that the expression (5) can be fulfilled.

$$HC3 - Hw3 > 0 \quad (6)$$

This expression (6) gives the condition that the magnetic domain of the record layer can be maintained at the reproduction temperature. In the expression (6), the right side of the expression is not a zero but a small positive value in a strict sense. This is because of the leaking magnetic field of the record layer itself. Thus, this positive value is a function of the composition and the film thickness etc. of the record layer.

Consequently, the condition where the present embodiment properly function, is to fulfill three expressions i.e. the expression (4) at the room temperature and the expressions (5) and (6) at the reproduction temperature, wherein Hw1 and Hw3 are expressed as following.

$$Hw1 = \sigma 1/2 \times (Ms1 \times h1)$$

$$Hw3 = \sigma 2/2 \times (Ms3 \times h3)$$

More concrete layer compositions of the layers will be explained here which fulfill the above mentioned expressions.

As the composition of the record layer R, $Tb_{22}(Fe_{90}Co_{10})_{78}$ [at %] can be used, and the film thickness thereof is about 50 nm, for example.

As the composition of the switch layer S, GdFeCo is suitable, to which a little amount of the other rare earth material such as Tb, Dy, Nd, Ho etc, may be included. Preferably, the component of Gd is in the range of 24 to 32 [at %], and more preferably, it is in the range of 26 to 29 [at %]. As for the Fe/Co ratio, it is preferable that the component of Co is in the range of 5 to 40 [at %], and it is more preferable in the range of 20 to 30 [at %]. For example, $Gd_{28}(Fe_{90}Co_{10})_{72}$ [at %] which is the compensation point recording material, can be preferably used, and the film thickness thereof is about 15 nm. Alternatively, DyFeCo may be used as the composition of the switch layer S, in which the component of Dy is preferably in the range of 23 to 29 [at %].

As the composition of the reproduction layer P, $Tb_{28}(Fe_{90}Co_{10})_{72}$ [at %] can be used, and the film thickness thereof is about 35 nm, for example.

Figure 2:
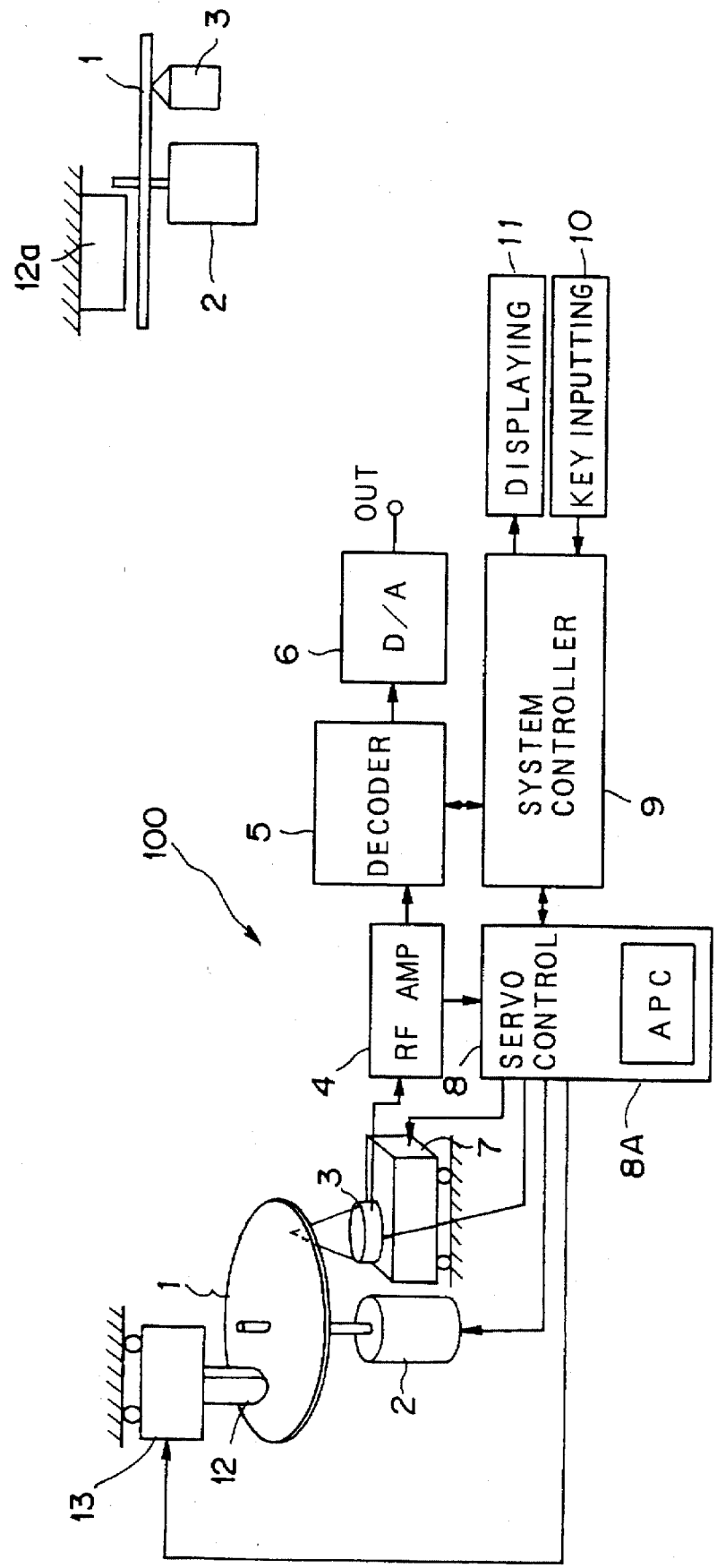
FIG. 2 is a block diagram of an apparatus for reproducing the optical disc of the first embodiment.

FIG. 2 shows a block diagram showing a construction of an optical disc reproducing apparatus for reproducing an analog signal on the basis of digital data recorded on the magneto optical disc of the first embodiment.

In FIG. 2, an optical disc reproducing apparatus 100 is provided with: a spindle motor 2 for driving to rotate the magneto optical disc 1; an optical pickup 3 having a laser diode, an actuator and a polarization beam splitter, for irradiating a laser beam onto the magneto optical disc 1, which is rotated, for receiving the beam, which polarization plane is slightly rotated by the magnetic Kerr effect at the magnetic layer of the magneto optical disc 1, and which is reflected and returned to the optical pickup 3, and for outputting the signal component in the returned beam as an RF (Radio Frequency) signal; an RF amplifier 4 for amplifying the RF signal to an appropriate level; a decoder 5 for decoding or demodulating the modulated signal corresponding to the record information from the amplified RF signal; a D/A convertor 6 for converting the digital signal, which is demodulated by the decoder 5, to the analog information signal; a carriage 7 for driving the optical pickup 3 in a radial direction of the magneto optical disc 1; a servo control circuit 8 for controlling the spindle motor 2, the carriage 7 and actuators for tracking and focusing in the optical pickup 3; a system controller 9 for controlling the optical disc reproducing apparatus 100 on the whole; a key inputting device 10 for inputting various operation commands from the external to the system controller 9; a displaying device 11 for displaying the information reproducing condition etc.; and an initializing magnet 12 for applying an initializing magnetic field to initialize the reproduction layer at the time of reproduction.

The servo control circuit 8 is provided with an APC (Automatic Power Control) circuit 8A for maintaining the light output power on a predetermined reproduction output level by receiving the output light from a monitoring photodiode which is equipped in the laser diode of the optical pickup 3, and controlling the driving current for the laser diode.

The initializing magnet 12 is constructed to be moved in the radial direction of the disc by a moving device 13 under the control of the servo control device 8, such that the radial position of the initializing magnet coincides with the radial position of the optical pickup 3. In stead of the initializing magnet 12 of such a movable type, an initializing magnet 12a of a fixed type can be used, as shown in FIG. 2A. In FIG. 2A, the initializing magnet 12a has a long body so as to cover all of the tracks of the magneto optical disc 1 without moving.

Nextly, the reproducing operation will be explained with referring to FIG. 3.

Figure 3:
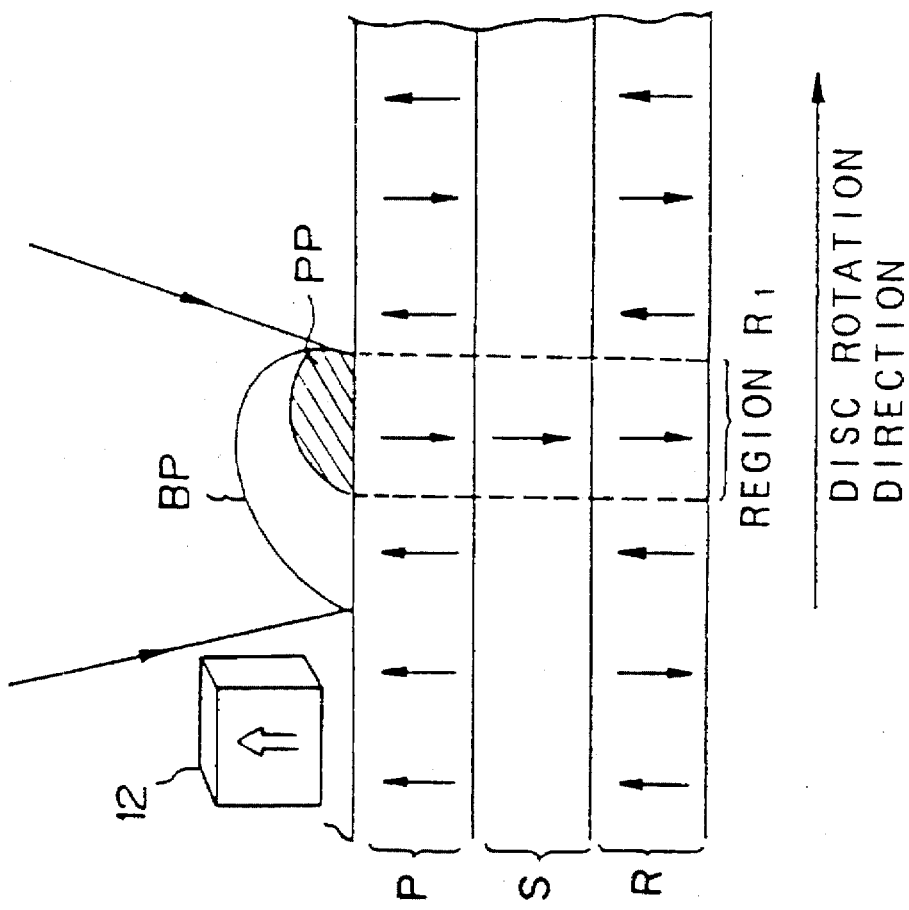
FIG. 3 is a diagram for explaining the reproducing operation of the optical disc of the first embodiment.

At the time of reproducing the information, as shown in FIG. 3, the magnetization direction of each small portions of the reproduction layer P is aligned in one direction (i.e. the upward direction in FIG. 3) by the initializing magnet 12 prior to the reproduction.

Nextly, the linearly polarized laser beam, which is the reproducing light, is irradiated by the optical pickup 3 onto a predetermined region BP, which includes a reproduction position PP, so as to increase the temperature of the reproduction position PP to be a predetermined reproduction temperature at which the switch layer S become in the perpendicular magnetization condition. This predetermined reproduction temperature is a temperature close to the compensation point temperature of the switch layer S.

As a result, the switch layer S becomes in the perpendicular magnetization condition, so that the switched connection force is applied between the reproduction layer P and the recording layer R. Thus, the record information of the record layer R is transferred to the reproduction layer P.

More concretely, in case of FIG. 3, the magnetization condition of the record layer R directed downward, is transferred to the reproduction layer P, so that the magnetization condition of the reproduction layer P which has been initialized into the upward direction, is directed downward.

By this, the polarization plane of the laser beam irradiated to the reproduction layer P at the reproducing position PP, is rotated into the direction corresponding to the perpendicular magnetization direction. The magnetic Kerr rotation angle, which is the rotation angle of the polarization plane, is detected by the optical pickup 3. Then, by use of the detected direction of the angle, the information can be reproduced through the RF amplifier 4, the decoder 5 and the D/A convertor 10.

Namely, the only information at the region R1 of the record layer R corresponding to the reproduction position PP, where the reproduction layer P has become in the perpendicular magnetization condition, within the irradiated region BP of the laser beam of the reproducing light. In this manner, the super resolution reproduction can be performed in the present embodiment. Further, since the reproduction domain is the high temperature domain $D_H$ in this case, the recording density can be increased in the track direction as well as the time axis direction, so that the high density recording can be performed by the optical disc of the present embodiment.

By the way, the reproduction layer P has a coercive force larger than the switch layer S. Thus, once the magnetization condition is transferred from the record layer R by the switched connection force, even if the temperature of the switch layer S is decreased to cause the inplane condition and the switched connection force is decreased, the transferred magnetization condition is maintained. However, since the magneto optical disc 1 is further rotated and initialized again at the condition where it has approximately rotated by one turn, the harmful influence to the reproducing operation is little.

Second Embodiment

The above mentioned first embodiment is performed on the basis of the information from the high temperature domain, by separating the domain in the laser beam spot into two domains of the high temperature domain and the low temperature domain i.e. the masked domain. However, in the second embodiment, both of the high temperature domain and the low temperature domain are used as the mask domain, while a middle temperature domain, which is a domain having a middle temperature between those two temperatures, is used as the reproduction domain, so that the reproduction can be performed while further increasing the recording density in the time axis direction.

The construction of the layers of the magneto optical disc and the construction of the optical disc reproducing apparatus of the second embodiment are the same as those in the first embodiment. Thus, the detailed description thereof are omitted.

The second embodiment has such a feature different from the first embodiment that it controls the APC circuit 8A in the servo control circuit 8 to decrease the coercive force of the reproduction layer P and to increase the temperature of the switch layer S to a temperature not less than the compensation point temperature Tcomp, by increasing the laser output power at the time of reproduction.

Figure 4:
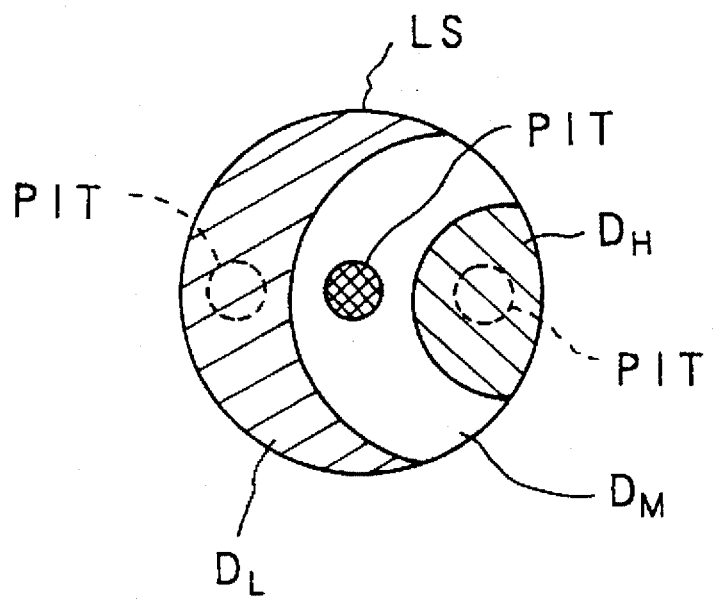
FIG. 4 is a diagram for explaining the reproducing operation according to a second embodiment.

As a result, the temperature distribution in the light spot becomes as shown in FIG. 4, wherein the switch layer S has a temperature close to the compensation point temperature Tcomp, in the middle temperature domain $D_M$, so that it becomes in the perpendicular magnetization condition.

Therefore, the switched connection force is strongly applied between the reproduction layer P and the record layer R in the middle temperature domain $D_M$ in FIG. 4. Thus, the record information of the record information R is transferred to the reproduction layer P only at the middle temperature domain $D_M$, so that the reproduction can be performed in the same manner as the first embodiment.

On the other hand, the record information of the record layer R in the high temperature domain $D_H$ and the low temperature domain $D_L$, is not transferred to the reproduction layer P so that those domains become in the masking condition, since the switch layer S thereof is in the inplane magnetization condition.

At this time, the magnetization direction of the high temperature domain $D_H$ becomes in the direction reverse to the magnetization direction of the low temperature domain $D_L$, because of the leak magnetic field of the reproduction layer P which is initialized. In this case, by applying the reproduction magnetic field Hr, the high temperature mask domain is stably formed, to obtain a less noise characteristic.

Third Embodiment

The third embodiment is such an embodiment that the area in the light spot is divided into three domains and two of the domains are used as the mask domain (hereinbelow, it is referred as "double masking") in the same manner as the second embodiment, so as to increase the recording density in the time axis direction.

The third embodiment has such a feature different from the second embodiment that it controls the curie point temperature of the switch layer, which becomes in the perpendicular magnetization condition at a temperature not less than the predetermined reproduction temperature, to perform easily and certainly double masking, and that the application of the initializing magnetic field is not required (i.e. the initializing magnet 12 in FIG. 2 is not necessary).

Figure 5:
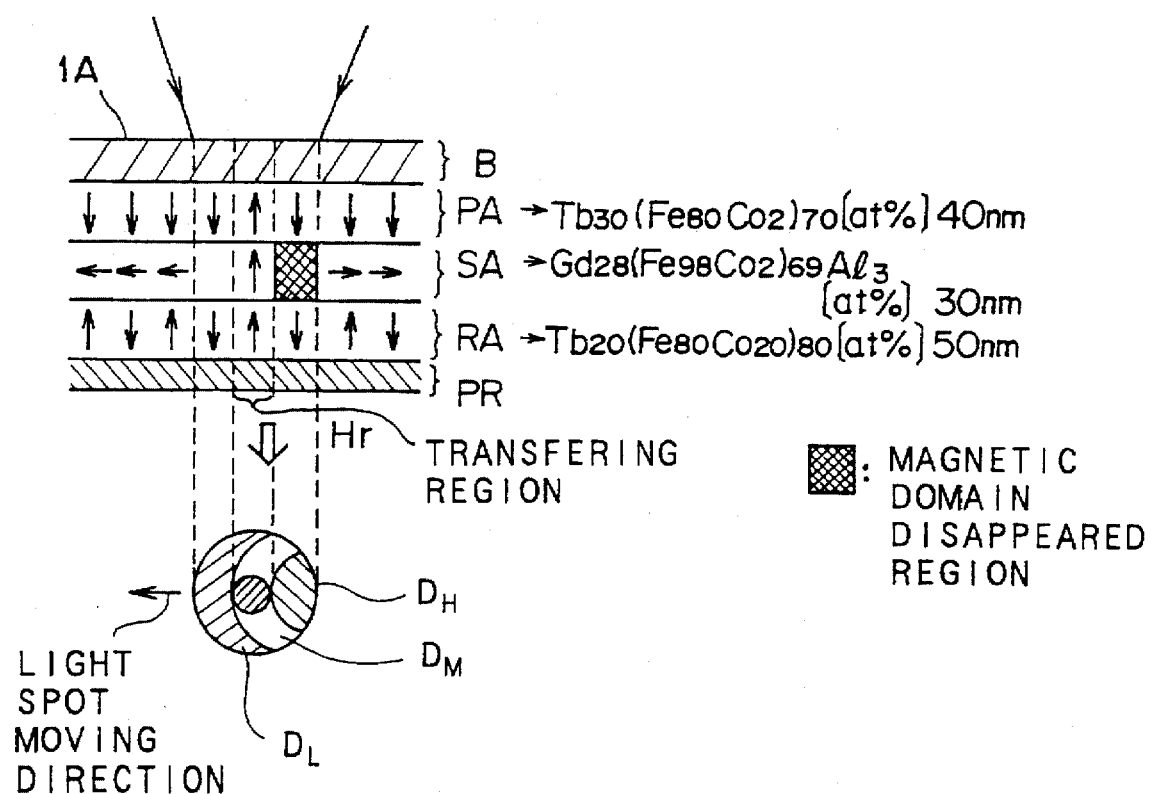
FIG. 5 is a diagram for explaining the cross sectional structure of the magneto optical disc according to a third embodiment and a temperature distribution within a light spot thereof.

A cross section of the magneto optical disc of the third embodiment is shown in FIG. 5.

In FIG. 5, a magneto optical disc 1A is provided with: a protection layer PR for protecting the magneto optical layer; a record layer RA for recording the information in the perpendicular magnetization direction; a switch layer SA which becomes in the perpendicular magnetization condition at a temperature not less than the predetermined reproduction temperature, and which becomes in the inplane magnetization condition at the room temperature; a reproduction layer PA formed so as to establish the switched connection with the record layer RA via the switch layer SA; and a substrate having a disc shape.

Here, the switch layer SA and the reproduction layer PA are explained in detail.

The temperature, at which the coercive force Hc of the switch layer SA is diverged, (=compensation temperature Tcomp), is determined by the Gd composition in the GdFeCo magneto optical film. The range where it becomes in the perpendicular magnetization condition i.e. the range where the rectangular (straight sided) shape ratio in a graph of FIG. 6, becomes 1, differs depending on the film forming condition, the foundation film, the kind of the rare earth element etc..

Figure 6:
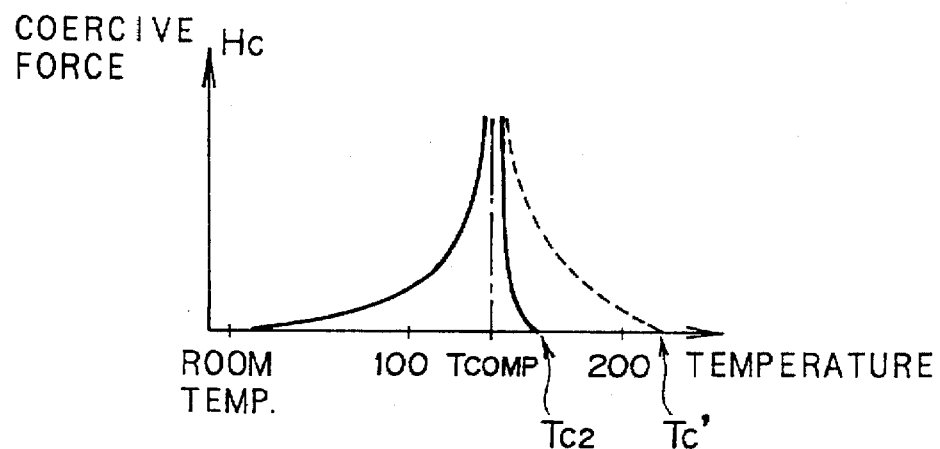
FIG. 6 is a graph for explaining the characteristic of a switch layer in the third embodiment.

Therefore, in the present embodiment, the range where the rectangular shape ratio=1 in the graph of FIG. 6, is narrowed by decreasing the Co component in the switch layer SA or by adding Al thereto.

More concretely, in case of forming the switch layer SA of $Gd_{28}(Fe_{98}Co_2)_{72}$ [at %], as shown in FIG. 6, the curie point temperature Tc2 (<Tc') is decreased as compared with the case of the first embodiment (curie point temperature= Tc') in which the switch layer S is formed of $Gd_{28}(Fe_{90}Co_{10})_{72}$ [at %], so that the range where the rectangular shape ratio=1 in the graph of FIG. 6, is substantially narrowed.

As a result, the switch layer SA is divided into three domains by the temperature distribution (i.e. temperature gradient) in the light spot, so as to establish double masking as mentioned below.

Figure 7:
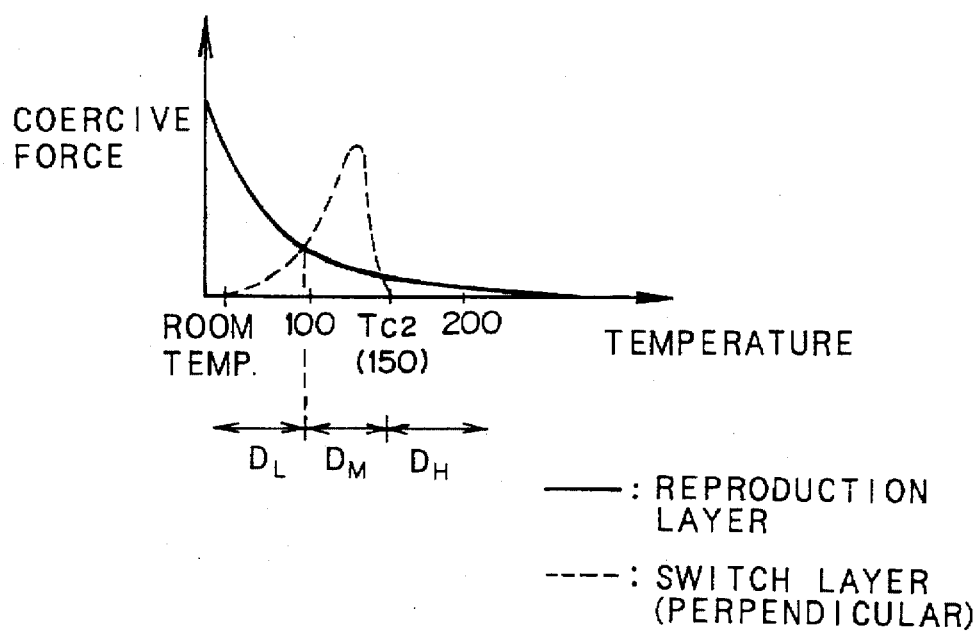
FIG. 7 is a graph for explaining the operation of the switch layer in the third embodiment.

Further, the coercive force in the perpendicular direction of the switch layer SA becomes almost zero at the room temperature, and the switch layer SA is in the inplane magnetization condition, as shown in FIG. 7. Thus, since the switched connection force cannot be transmitted to the reproduction layer PA from the record layer RA, the initializing magnetic field is not necessary.

In more detail, by applying the reproduction magnetic field, the record mark of the reproduction layer PA is erased right after the light spot passes therethrough (the high temperature domain in FIG. 7).

By cooling this domain, when it becomes the middle temperature domain $D_M$ (in FIG. 7), the vertical magnetic anisotropy of the switch layer SA is increased, so that the record mark is once transferred in the order of: the record layer RA→the switch layer SA→the reproduction layer PA.

When it is further cooled down to be in the low temperature domain $D_L$ (in FIG. 7), the perpendicular magnetic anisotropy of the switch layer SA is disappeared, and the switched connection force is not transmitted. Thus, the apparent coercive force of the reproduction layer PA is decreased.

Therefore, the reproduction layer PA is homogeneously magnetized again by the reproduction magnetic field, and the record mark is erased. Namely, the initialization is performed, and there is no need applying the initializing magnetic field again.

As explained above, by use of the switch layer SA of the present embodiment, the initializing magnetic field is not required. However, in order to perform the initialization more easily, the reproduction layer PA is constructed as following.

Generally, a diameter Dmin of a minimum stabilized magnetic domain of the perpendicular magnetized film, is expressed by a following expression, in which σw represents the energy of a magnetic domain wall, Ms represents the magnetization of the perpendicular magnetization film, and Hc represents the coercive force when the perpendicular magnetization film is solely provided.

$$Dmin = \sigma w / (Ms \times Hc)$$

Therefore, the material having a large diameter Dmin of the minimum stabilized magnetic domain is used for the reproduction layer PA.

By this, in the temperature domain, where the switch layer SA transmits the switched connection force, the diameter Dmin of the minimum stabilized magnetic domain becomes small. In other temperature domains, the diameter Dmin of the minimum stabilized magnetic domain in case of solely forming the reproduction layer PA is appeared. Thus, the record mark of the reproduction layer PA is set to be less than this diameter Dmin of the minimum stabilized magnetic domain.

As a result, when the switched connection force is not transmitted, the record mark of the reproduction layer PA is reduced and naturally disappeared since it cannot maintain the stability of the magnetic domain. In this manner, the initialization can be easily performed.

A concrete construction of layers which fulfills the above described condition, will be explained here with referring to FIG. 5.

As the composition of the record layer RA, $Tb_{20}(Fe_{80}Co_{20})_{80}$ [at %] can be used, and the film thickness thereof is about 50 nm, for example.

As the composition of the switch layer SA, $Gd_{28}(Fe_{98}Co_2)_{69}Al_3$ [at %] which is the compensation point recording material, can be used, and the film thickness thereof is about 30 nm, for example.

In this case, the reason why the Co component is reduced and Al component is added in the switch layer SA of the magneto optical disc as compared with the first embodiment, is to decrease the curie point temperature of the switch layer SA. The compositions of those Co and Al in the switch layer SA are preferably in the range as following.

0 [at %] ≦ Co ≦ 5 [at %]

0 [at %] ≦ Al ≦ 5 [at %]

If the Al component is increased too much, the magnetic characteristic is degraded.

As the composition of the reproduction layer PA, $Tb_{30}(Fe_{80}Co_2)_{70}$ [at %] can be used, and the film thickness thereof is about 40 nm, for example.

Nextly, the reproducing operation of the present embodiment, will be explained with referring to FIG. 2 and FIG. 5.

Figure 8:
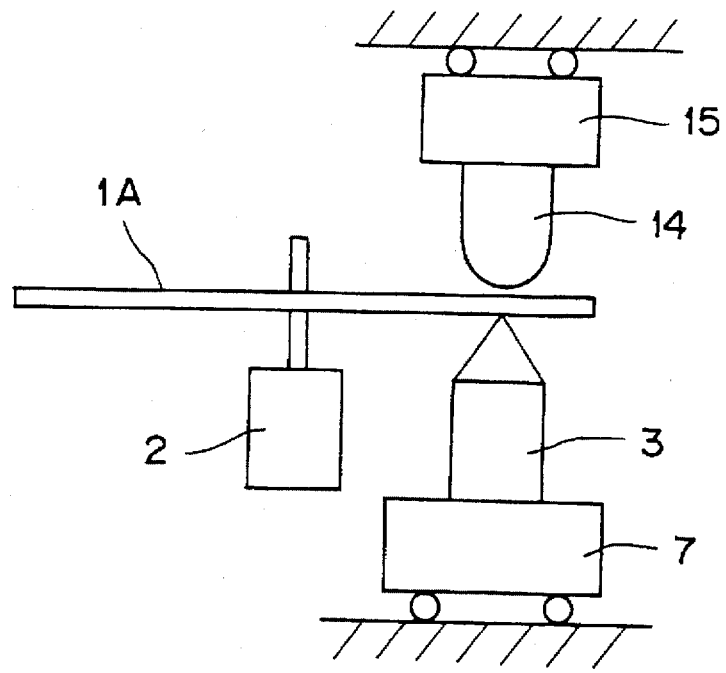
FIG. 8 is a diagram showing a construction of an optical pickup and a reproduction magnet used for reproducing the magneto optical disc of the third embodiment.

In this case, the initializing magnet 12 is not necessary, but a reproduction magnet 14 for applying a reproduction magnetic field Hr is required as shown in FIG. 8. In FIG. 8, the reproduction magnet 14 is moved by a carrier 14 such that the reproduction magnet 14 is always opposed to the optical pickup 13, which is moved by the carrier 7, on the other side of the magneto optical disc 1A.

At first, the laser beam of linearly polarized light, which is the reproducing light, is irradiated onto the area including the reproduction position, by the pickup 3, such that the temperature of the reproduction position becomes the reproduction temperature at which the switch layer SA becomes in the perpendicular magnetization condition. This reproduction temperature is, as in the case of the first embodiment, the temperature close to the compensation temperature of the switch layer SA.

As a result, the temperature distribution in the light spot becomes as shown in FIG. 5, wherein the temperature of the switch layer SA becomes the temperature close to the compensation temperature Tcomp in the middle temperature domain $D_M$, which becomes in the perpendicular magnetization condition.

As a result, the switched connection force is applied or generated between the corresponding record layer RA and the corresponding reproduction layer PA. Thus, the middle temperature domain $D_M$ becomes the transferrable domain, so that the record information of the record layer RA is transferred to the reproduction layer PA, and that the reproduction is performed in the same manner as the first embodiment.

On the other hand, the switch layer SA in the low temperature domain $D_L$, is in the inplane magnetization condition as shown in FIG. 5. Thus, the switched connection force is not applied or generated between the record layer RA and the reproduction layer PA. Therefore, the information of the record layer RA is not transferred to the reproduction layer PA, and the low temperature domain $D_L$ becomes the mask domain.

Further, in the switch layer SA of the high temperature domain $D_H$, the magnetic domain is disappeared as shown in FIG. 5. Thus, the switched connection force is not applied in the same manner as the low temperature domain $D_L$. Therefore, the information of the record layer RA is not transferred to the reproduction layer PA, and the high temperature domain $D_H$ also becomes the mask domain.

As described above, it is easy to perform double masking, and the reproduction can be performed while increasing the recording density in the time axis direction, according to the third embodiment.

Fourth Embodiment

In each magneto optical disc of the above explained embodiments, the alloy of the rare earth element and the transition metal, which makes the Kerr rotation angle small in the blue light (i.e. short wavelength laser) region, is used as the material for the reproduction layer. Thus, they are not so suitable for the reproduction by use of the blue laser since the C/N (Carrier to Noise) ratio would be degraded.

Accordingly, the fourth embodiment is constructed such that the reproduction can be performed while keeping the C/N ratio high without reducing the Kerr rotation angle, even if the blue laser is used as the light source.

Figure 9:
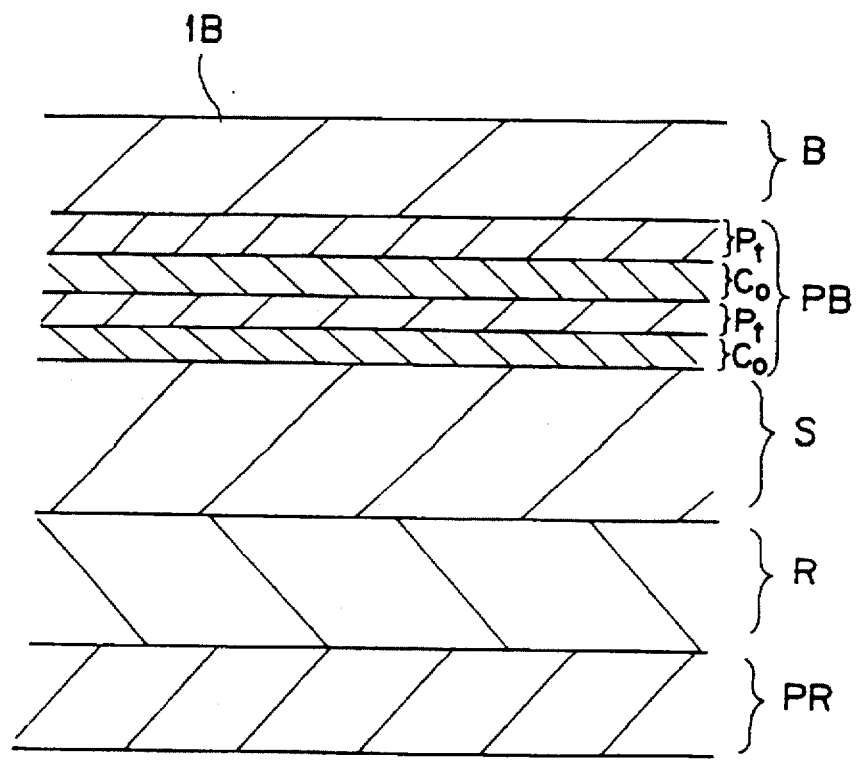
FIG. 9 is a cross sectional view showing a construction of one example of the magneto optical disc according to the fourth embodiment of the present invention.

As the reproduction layer in the fourth embodiment, it is possible to use the Pt/Co laminated film. FIG. 9 shows a magneto optical disc 1B as one example of the fourth embodiment, in which the reproduction layer PB consists of the Pt/Co laminated film.

Alternatively, as the reproduction layer in the fourth embodiment, a single layer composed of PtCo alloy layer may be used in place of the reproduction layer P in the layer structure shown of FIG. 1 or in place of the reproduction layer PA in the layer structure of FIG. 5.

Figure 10:
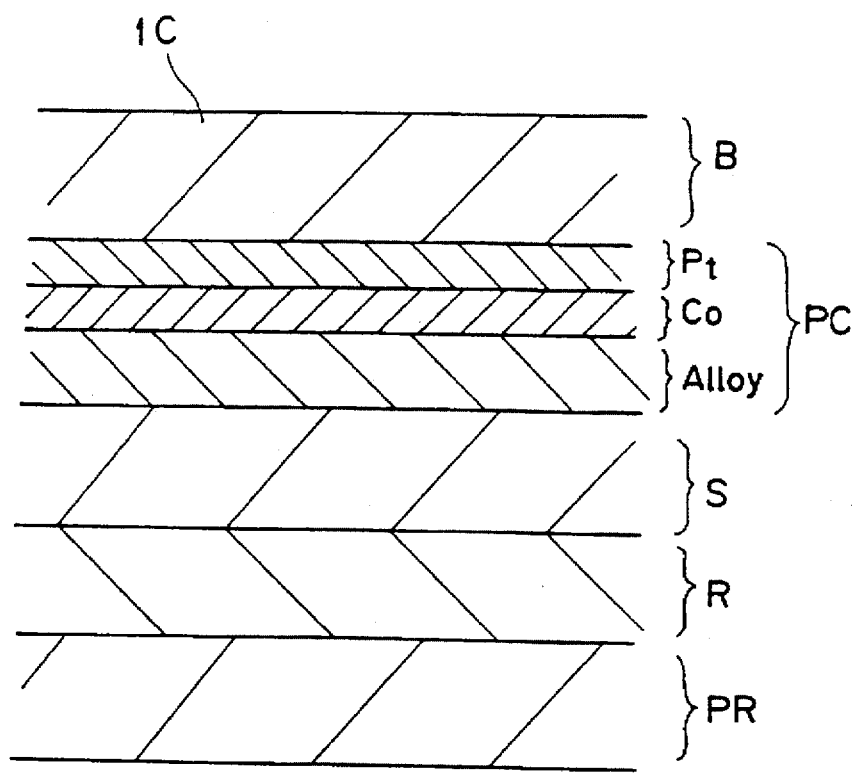
FIG. 10 is a cross sectional view showing a construction of another example of a magneto optical disc according to a fourth embodiment of the present invention.
Figure 11:
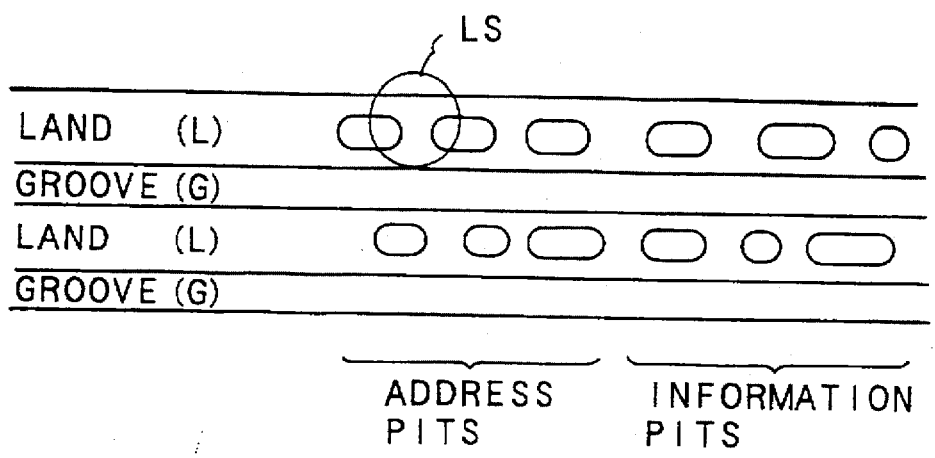
FIG. 11 is a diagram for explaining a construction of an information recording surface of a magneto optical disc in the related art.
Figure 12:
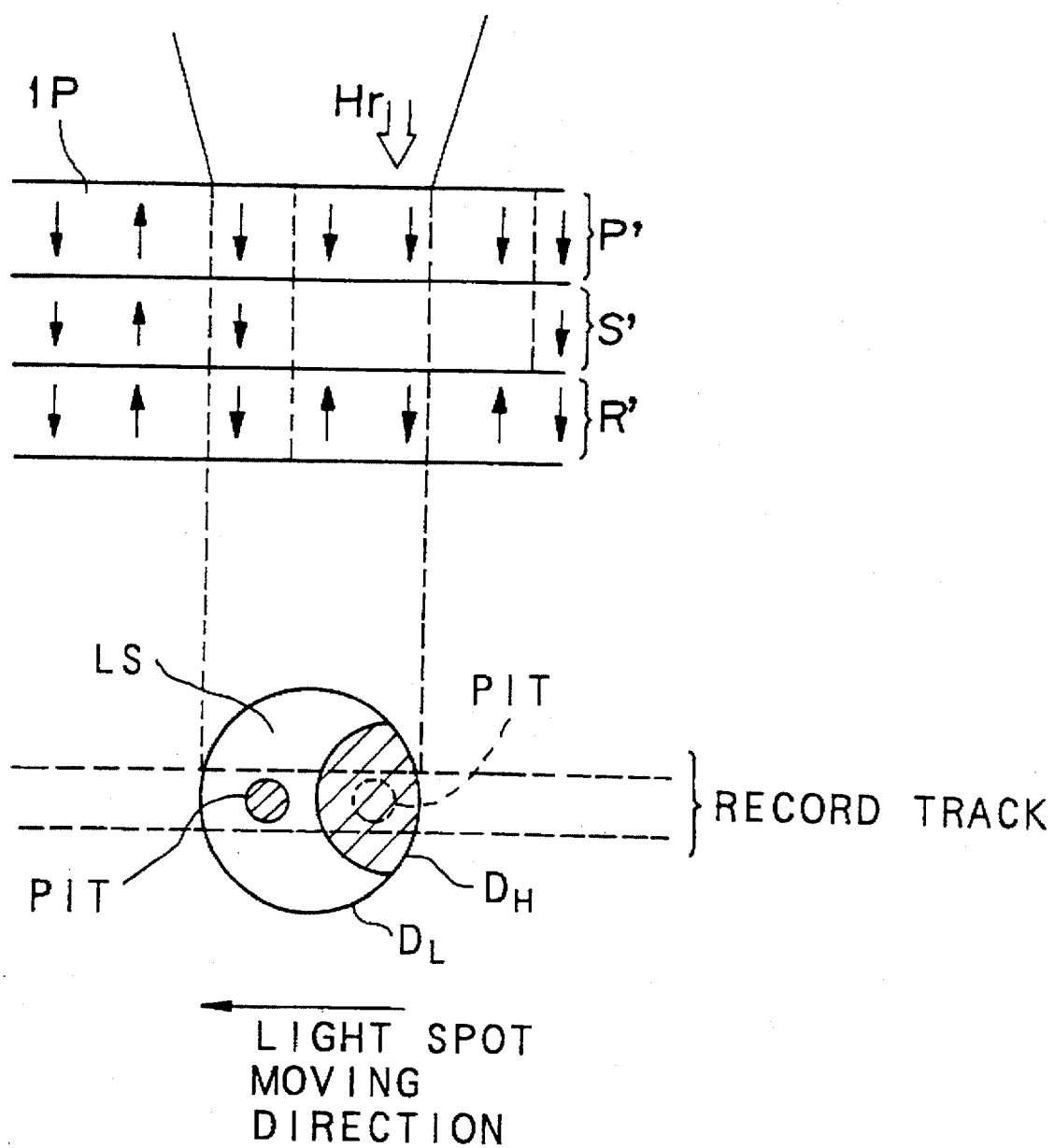
FIG. 12 is a diagram for explaining the cross sectional structure of the magneto optical disc of FIG. 11 and a temperature distribution within a light spot thereof.

It is also possible to form the Pt/Co laminated film or PtCo alloy layer in the direction of the light spot irradiation, and nextly form the alloy of the rare earth element and the transition metal (e.g. TbFeCo) thereon, if the reproduction layer is formed to have the laminated structure, e.g. two layers structure. FIG. 10 shows a magneto optical disc 1C as another example of the fourth embodiment, in which the reproduction layer PC consists of the Pt/Co laminated film and the alloy of the rare earth element and the transition metal.

According to the fourth embodiment, even if the blue laser is used as the light source, the Kerr rotation angle is not made small, and the C/N ratio can be maintained to be a high level at the time of reproduction.

In the above described embodiments, the analog signal from the external is recorded on the optical disc as the digital signal, and the analog signal is reproduced on the basis of the recorded digital signal. However, it is possible to apply the present invention to the optical disc, which records the digital signal, and the optical disc reproducing apparatus thereof, and also to the optical disc, which records the analog signal, and the optical disc reproducing apparatus thereof.

According to the magneto optical disc of the present embodiment, the record information is transferred from the record layer to the reproduction layer only at the reproduction position corresponding to the position where the perpendicular magnetic anisotropy of the switch layer becomes large. Thus, by constructing the optical system to detect the information form this reproduction position, the information can be reproduced from the area smaller than the light spot area of the reproducing light.

Namely, the super resolution reproduction can be performed. At the same time, since the reproduction position is in the high temperature domain in the back portion of the light spot, the recording density of the information can be increased in the track direction, as well as the time axis direction.

Furthermore, according to the optical disc reproducing apparatus of the present embodiment, since the record information of the record layer is transferred only at the reproduction position, where the perpendicular magnetic anisotropy of the switch layer is increased. The reproduction is performed by receiving the reproduction light from the reproduction position by use of the reproduction device. Thus, the information from the area smaller than the light spot of the reproducing light can be performed, and the super resolution reproduction can be easily performed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A magneto optical disc, comprising:

a record layer to which information is magnetically recorded in information pits so that the magnetization of each information pit is directed in either one of two directions perpendicular to a surface of the optical disc;

a switch layer, having perpendicular magnetic anisotropy at room temperature that is lower than that at a reproduction temperature, said reproduction temperature being determined by an irradiation power of a reproducing light beam; and a reproduction layer on an opposite side of said switch layer from, said record layer to which the magnetization of the information pits is transferred by a switched connection force of said switch layer wherein said record layer, switch layer and reproduction layer satisfy the following:

Hc1<Hini<Hc3 at room temperature; and

Hw1>Hc1 and Hc3−Hw3>0 at the reproduction temperature where

Hc1=coercive force of the reproduction layer;

Hc3=coercive force of the record layer;

Hw1=switched connection force applied to the reproduction layer from the switch layer;

Hw3=switch connection force applied to the record layer from the switch layer; and Hini=initializing magnetic field applied to said optical disc whereby an initializing magnetic field applied to said optical disc initializes only said reproduction layer and not said record layer.

2. A magneto optical disc according to claim 1, wherein said record layer comprises an alloy of rare earth element and transition metal.

3. A magneto optical disc according to claim 1, wherein said switch layer comprises a compensation point recording material exhibiting inplane magnetization at room temperature and perpendicular magnetization at the reproduction temperature.

4. A magneto optical disc according to claim 3, wherein said switch layer further comprises aluminum.

5. A magneto optical disc according to claim 1, wherein said reproduction layer comprises an alloy of rare earth element and transition metal.

6. A magneto optical disc according to claim 1, wherein said reproduction layer comprises a Pt/Co laminated film.

7. A magneto optical disc according to claim 1, wherein said reproduction layer comprises a PtCo alloy.

8. A magneto optical disc according to claim 1, wherein said reproduction layer comprises a Pt/Co laminate film and an alloy layer of rare earth element and transition metal.

9. A magneto optical disc according to claim 1, wherein said reproduction layer comprises a PtCo alloy layer and an alloy layer of rare earth element and transition metal.

* * * * *